United States Patent
McDonald et al.

[11] Patent Number: 6,073,216
[45] Date of Patent: *Jun. 6, 2000

[54] SYSTEM AND METHOD FOR RELIABLE SYSTEM SHUTDOWN AFTER COHERENCY CORRUPTION

[75] Inventors: Edward A. McDonald, Baton Rouge, La.; James M. Ottinger, Duluth, Ga.; Harry W. Scrivener, Columbia, S.C.

[73] Assignee: Intel Corporation, Santa Clara, Calif.

[*] Notice: This patent is subject to a terminal disclaimer.

[21] Appl. No.: 08/980,882

[22] Filed: Nov. 25, 1997

[51] Int. Cl.[7] .................................................. G06F 12/08
[52] U.S. Cl. .............................................. 711/141; 714/5
[58] Field of Search ................................... 711/119, 141, 711/144, 145, 146; 714/1, 2, 3, 5, 8

[56] References Cited

U.S. PATENT DOCUMENTS

| | | | |
|---|---|---|---|
| 5,283,876 | 2/1994 | Tague | 395/400 |
| 5,428,761 | 6/1995 | Herlihy et al. | 395/425 |
| 5,434,994 | 7/1995 | Shaheen et al. | 395/500 |
| 5,544,345 | 8/1996 | Carpenter et al. | 395/477 |
| 5,581,729 | 12/1996 | Nishtala et al. | 395/470 |
| 5,615,353 | 3/1997 | Lautzenheiser | 395/463 |

*Primary Examiner*—Eddie P. Chan
*Assistant Examiner*—Kevin L. Ellis
*Attorney, Agent, or Firm*—Blakely, Sokoloff, Taylor & Zafman LLP

[57] ABSTRACT

There is disclosed a memory control circuit for use in a processing system containing a plurality of processors coupled to a main memory by a common bus. The memory control circuit is adapted for implementing directory-based coherency in the processing system according to a selected coherency algorithm and comprises: 1) monitoring circuitry for detecting coherency corruption in a coherency directory associated with the main memory; and 2) coherency control circuitry responsive to a detection of coherency corruption in the coherency directory for dynamically modifying the selected coherency algorithm, thereby enabling the processing system to shut down in a controlled manner. In some embodiments, the monitoring circuitry further detects possible system coherency failure conditions external to the coherency directory and the coherency control circuitry responds to the detection of a possible system coherency failure condition by dynamically modifying the selected coherency algorithm, thereby enabling the processing system to shut down in a controlled manner.

20 Claims, 3 Drawing Sheets

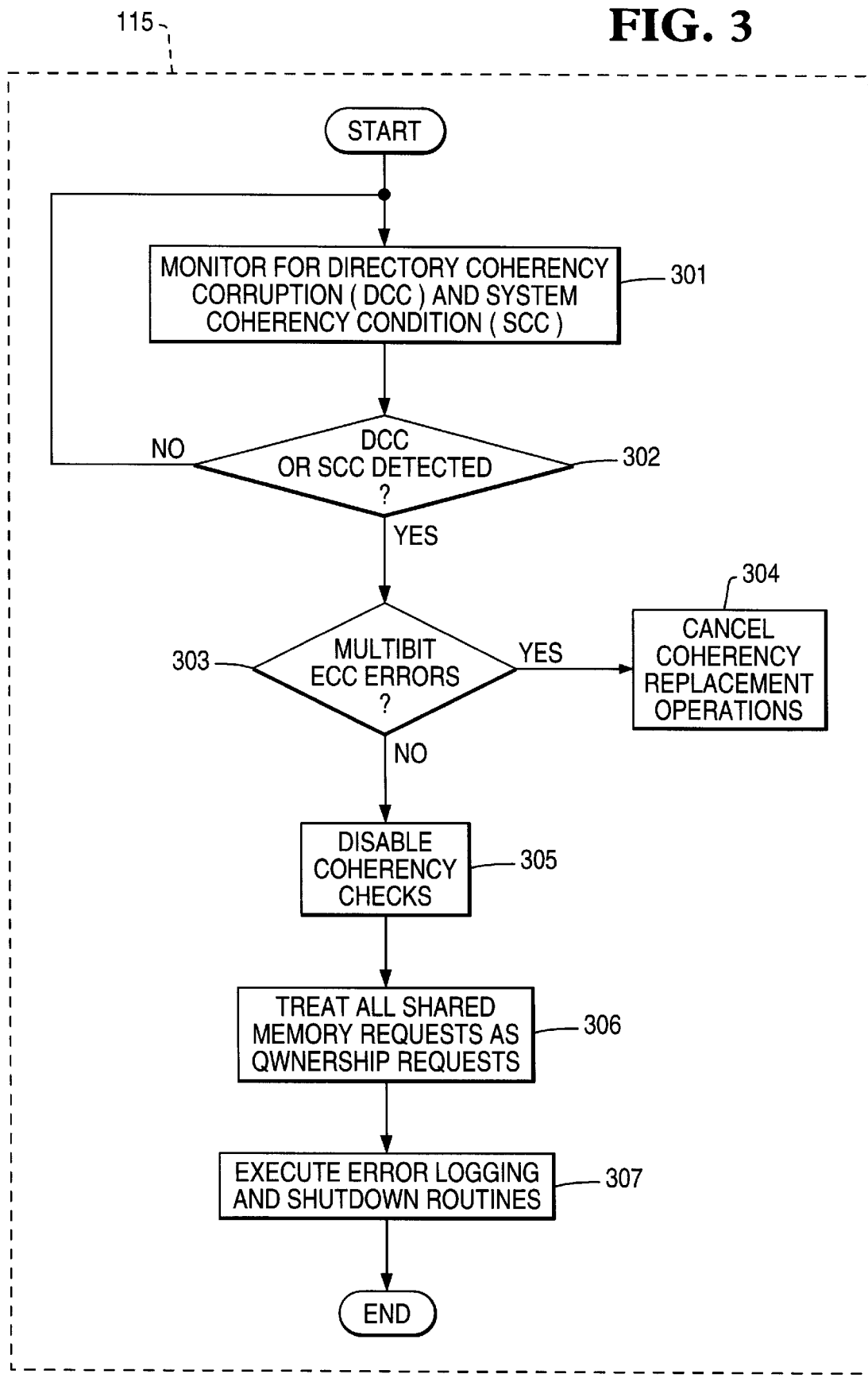

SYSTEM AND METHOD FOR RELIABLE SYSTEM SHUTDOWN AFTER COHERENCY CORRUPTION

CROSS-REFERENCE TO RELATED PATENT APPLICATIONS

The present invention is related to those disclosed in U.S. patent application Ser. No. 08/760,126, filed Dec. 3, 1996 and entitled "COMPUTER SYSTEM INCLUDING MULTIPLE SNOOPED, MULTIPLE MASTERED SYSTEM BUSSES AND METHOD FOR INTERCONNECTING SAID BUSSES," and in U.S. patent application Ser. No. 08/762,636, filed Dec. 9, 1996 and entitled "METHOD AND APPARATUS FOR CACHING STATE INFORMATION WITHIN A DIRECTORY-BASED COHERENCY MEMORY SYSTEM." U.S. patent application Ser. Nos. 08/760,126 and 08/762,636 are commonly assigned to the assignee of the invention disclosed in this patent application and are hereby incorporated by reference as if fully set forth herein.

TECHNICAL FIELD OF THE INVENTION

The present invention is directed, in general, to multiprocessor systems and, more specifically, to systems and methods for controllably shutting down a multiprocessor system employing directory-based coherency after coherency has been or may have been corrupted.

BACKGROUND OF THE INVENTION

Increasingly, state-of-the-art computer applications implement high-end tasks that require multiple processors for efficient execution. Multiprocessor systems allow parallel execution of multiple tasks on two or more central processor units ("CPUs"). A typical multiprocessor system may be, for example, a network server. Preferably, a multiprocessor system is built using widely available commodity components, such as the Intel Pentium® Pro processor (also called the "Pentium® Pro" processor), PCI I/O chipsets, P6 bus topology, and standard memory modules, such as SIMMs and DIMMs. There are numerous well-known multiprocessor system architectures, including symmetrical multiprocessing ("SMP"), non-uniform memory access ("NUMA"), cache-coherent NUMA ("CC-NUMA"), clustered computing, and massively parallel processing ("MPP").

A symmetrical multiprocessing ("SMP") system contains two or more identical processors that independently process as "peers" (i.e., no master/slave processing). Each of the processors (or CPUs) in an SMP system has equal access to the resources of the system, including memory access. A NUMA system contains two or more equal processors that have unequal access to memory. NUMA encompasses several different architectures that can be grouped together because of their non-uniform memory access latency, including replicated memory cluster ("RMC"), MPP, and CC-NUMA. In a NUMA system, memory is usually divided into local memories, which are placed close to processors, and remote memories, which are not close to a processor or processor cluster. Shared memories may be allocated into one of the local memories or distributed between two or more local memories. In a CC-NUMA system, multiple processors in a single node share a single memory and cache coherency is maintained using hardware techniques. Unlike an SMP node, however, a CC-NUMA system uses a directory-based coherency scheme, rather than a snoopy bus, to maintain coherency across all of the processors. RMC and MPP have multiple nodes or clusters and maintain coherency through software techniques. RMC and MPP may be described as NUMA architectures because of the unequal memory latencies associated with software coherency between nodes.

All of the above-described multiprocessor architectures require some type of cache coherence apparatus, whether implemented in hardware or in software. High speed CPUs, such as the Pentium® Pro processor, utilize an internal cache and, typically, an external cache to maximize the CPU speed. Because a SMP system usually operates only one copy of the operating system, the interoperation of the CPUs and memory must maintain data coherency. In this context, coherency means that, at any one time, there is but a single valid value for each datum. It is therefore necessary to maintain coherency between the CPU caches and main memory.

One popular coherency technique uses a "snoopy bus." Each processor maintains its own local cache and "snoops" on the bus to look for read and write operations between other processors and main memory that may affect the contents of its own cache. If a first processor attempts to access a datum in main memory that a second processor has modified and is holding in its cache, the second processor will interrupt the memory access of the first processor and write the contents of its cache into memory. Then, all other snooping processors on the bus, including the first processor, will see the write operation occur on the bus and update their cache state information to maintain coherency.

Another popular coherency technique is "directory-based cache coherency." Directory-based caching keeps a record of the state and location of every block of data in main memory. For every shareable memory address line, there is a presence bit for each coherent processor cache in the system. Whenever a processor requests a line of data from memory for its cache, the presence bit for that cache in that memory line is set. Whenever one of the processors attempts to write to that memory line, the presence bits are used to invalidate the cache lines of all the caches that previously used that memory line. All of the presence bits for the memory line are then reset and the specific presence bit is set for the processor that is writing to the memory line. Therefore, the processors do not have to reside on the snoop bus because the directory maintains coherency for the individual processors.

Directory-based coherency schemes that have a directory entry for every cache line in main memory can become prohibitively large. For example, a 1 Gbyte main memory may typically comprise 33,554,432 memory lines or blocks, where each line contains 32 bytes of data (equivalent to a cache line in Pentium® Pro processors). A corresponding "full" directory contains a memory line status table ("MLST") that has 33,554,432 entries, where each directory entry in the MLST contains several state bits. The state bits are typically MESI-type bits that indicate whether a cache line has been modified by a CPU, and whether a cache line is shared by two or more CPUs or is exclusively controlled by a single CPU.

For example, if the 1 Gbyte directory described above stored four (4) state bits per entry, then sixteen (16) megabytes of RAM are need to store the entire MLST. The RAM requirements are even higher if ECC bits are also stored in the MLST. The full directory becomes prohibitively expensive if it is implemented using SRAM.

U.S. patent application Ser. No. 08/762,636, incorporated by reference above, discloses a limited-sized directory which caches state bits for only a subset of the 32-byte blocks from main memory in a direct-mapped cache using well-known caching techniques. Entries in the limited directory are accessed by submitting the same address used to access main memory. The N most significant address bits are stored as "tag" bits in a tag array (or tag field) in the limited directory. The corresponding state bits are stored in a state array (or state field) and ECC bits may also be stored. The M next most significant address bits of the current address are used as an index to point to specific directory entries. If the N most significant bits stored in the tag array match the N most significant bits of the current address, a "HIT" has occurred. If the bits do not match, a "MISS" has occurred and a replacement coherency transaction is executed to update the entry in the limited directory.

The invention disclosed in U.S. patent application Ser. No. 08/762,636 takes advantage of the fact that rarely is all, or even a large portion, of main memory being cached at any given time by the CPUs in the multiprocessor system. Hence, a coherency directory may be implemented as a direct-mapped cache that uses a much smaller amount of very fast SRAM. The limited directory can store state bits, tag bits and ECC bits for a much smaller subset of the 32-byte blocks in main memory without incurring a significant performance penalty due to cache misses.

It is well-known that data in caches, including SRAM caches, can become corrupted. In the case of a multi-processor system implementing a limited directory cache, the system may stall (or "hang") due to the Pentium® Pro bus protocol when coherency has not been maintained. This stall will prevent the system software from logging errors and shutting the system down in a controlled manner, thereby also preventing a more efficient recovery.

Therefore, there is a need in the art for improved multi-processor systems that implement more fault-tolerant directory-based coherency algorithms. In particular, there is a need in the art for directory-based coherency systems and methods that ensure reliable system shutdown after the detection of fatal errors that are caused by, or may result in, a corrupted coherency directory. There is a still further need, in a multiprocessor system implementing directory-based coherency, for improved systems and methods that dynamically change the directory-based coherency algorithms after detection of coherency corruption in order to controllably shut down the multiprocessor system.

SUMMARY OF THE INVENTION

The problems inherent in the prior art associated with the controlled shutdown of multi-processor systems after coherency corruption are overcome by the present invention. In one embodiment of the present invention, a memory control circuit is provided for use in a processing system containing a plurality of processors coupled to a main memory by a common bus. The memory control circuit is adapted for implementing directory-based coherency in the processing system according to a selected coherency algorithm and comprises: 1) monitoring circuitry for detecting coherency corruption in a coherency directory associated with the main memory; and 2) coherency control circuitry responsive to a detection of coherency corruption in the coherency directory for dynamically modifying the selected coherency algorithm, the modified coherency algorithm enabling the processing system to shut down in a controlled manner.

In other embodiments of the present invention, the coherency directory is a cache memory containing state information associated with a subset of memory lines in the main memory.

In further embodiments of the present invention, the monitoring circuitry further detects possible system coherency failure conditions external to the coherency directory and the coherency control circuitry responds to the detection of a possible system coherency failure condition by dynamically modifying the selected coherency algorithm, the modified coherency algorithm enabling the processing system to shut down in a controlled manner.

In still other embodiments of the present invention, the monitoring circuitry monitors multi-bit ECC errors in directory information associated with memory lines in the main memory.

In still further embodiments of the present invention, the memory control circuit disables coherency replacement operations in the coherency directory for any entry that has multi-bit ECC errors in the directory information.

In other embodiments of the present invention, the memory control circuit treats a shared memory request received from a first processor as a memory request for a cache line to be held exclusively by the first processor.

In further embodiments of the present invention, the memory control circuit treats a shared memory request received from a first processor as a memory request for a cache line to be held modified by the first processor.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like numbers designate like objects/things and in which:

FIG. 3 is a flow diagram depicting the operation of an exemplary advanced memory controller upon detection of directory coherence corruption in the exemplary coherence directory or a possible system coherency failure condition in the SMP system according to one embodiment of the present invention.

DETAILED DESCRIPTION

Although the text that follows describes the present invention in a symmetric multiprocessing system, it should be clearly understood that this is by way of illustration only. Those skilled in the art will understand that the principles of the present invention may readily be incorporated in a wide variety of multiprocessor systems, including but not limited to NUMA, RMC, CC-NUMA, MPP, and other like systems, in order to improve recovery from coherency loss. Additionally, the phrase "associated with" and derivatives thereof, as used herein, may mean to include, be included within, interconnect with, contain, be contained within, connect to or with, couple to or with, be communicable with, cooperate with, interleave, be a property of, be bound to or with, have, have a property of, or the like.

Figure 1:
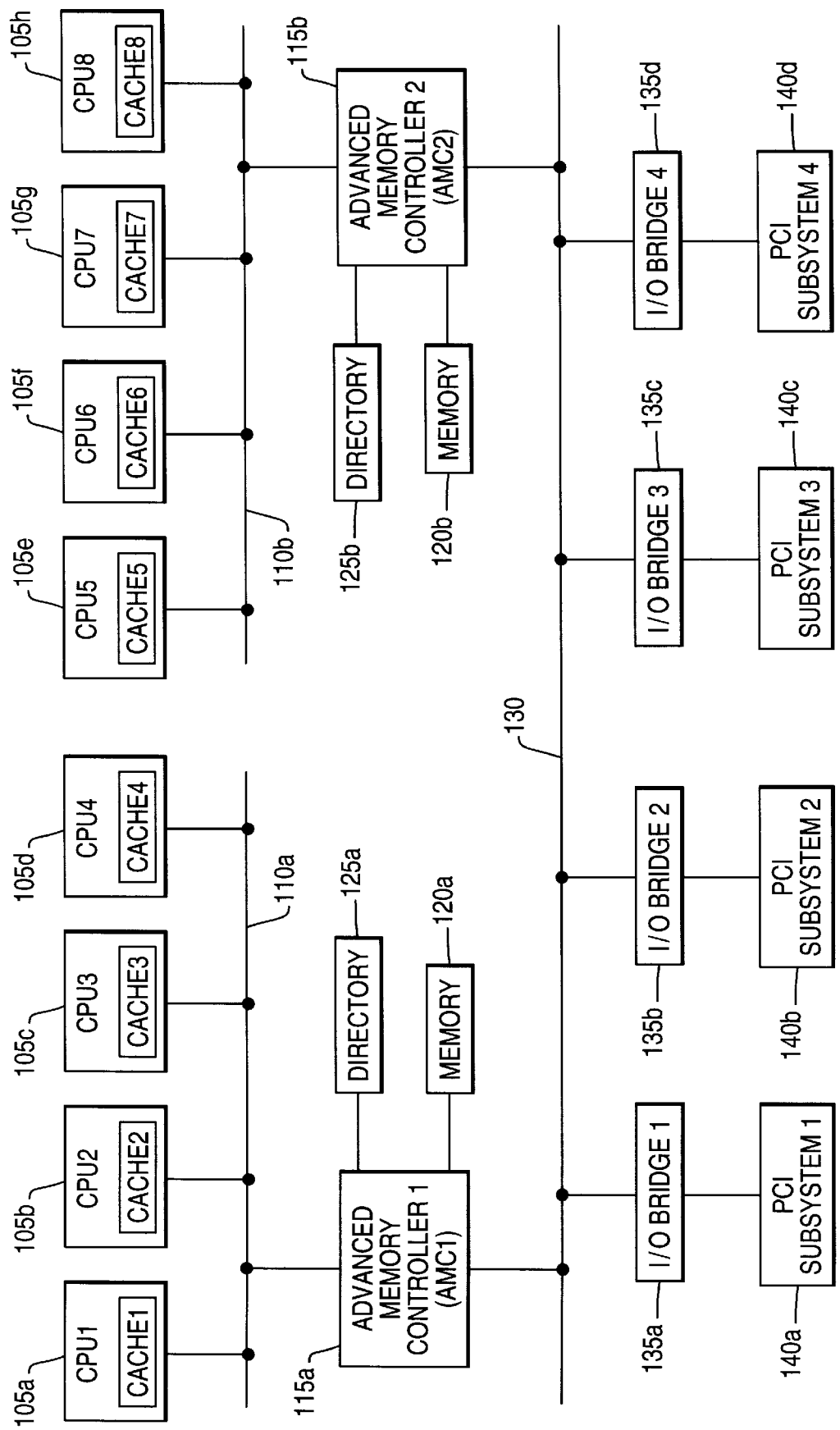
FIG. 1 is a block diagram of an exemplary eight processor standard high volume symmetric multiprocessing computer system employing a pair of advanced memory controllers in accordance with one embodiment of the present invention.

Turning initially to FIG. 1, illustrated is a block diagram of an exemplary eight processor standard high volume ("SHV") symmetric multiprocessing ("SMP") system (generally designated 100) employing a pair of advanced memory controllers 115 in accordance with one embodiment of the present invention. SMP system 100 contains two separate processor building blocks. A first building block comprises processors 105a–105d (hereafter, "CPU1" through "CPU4"), advanced memory controller 115a (hereafter, "AMC1"), memory 120a and directory 125a. A second building block comprises processors 105e–105h (hereafter, "CPU5" through "CPU8"), advanced memory controller 115b (hereafter, "AMC2"), memory 120b and directory 125b. The two building blocks are interconnected by a common I/O bus 130.

Within the first building block, CPU1 through CPU4 are coupled to AMC1 by CPU bus 110a. Within the second building block, CPU5 through CPU8 are coupled to AMC2 by CPU bus 110b. In one embodiment of the present invention, CPU bus 110 is high-bandwidth split-transaction bus coupled to one port of the AMC. The second port of the AMC is coupled to I/O bus 130. I/O bus 130 is coupled to four PCI subsystems 140a through 140d (hereafter, "PCI Subsystem 1" through "PCI Subsystem 4") by means of I/O bridges 135a–135d (hereafter, I/O Bridge 1 through I/O Bridge 4). AMC 1 and AMC 2 control access to memory 120a and memory 120b, respectively. In one embodiment of the present invention, memory 120a and memory 120b are DRAM arrays in which coherency is maintained by use of protocols and a directory.

SMP system 100 implements a hybrid cache coherency scheme to keep track of data moving between and among the various CPU caches, memories 120a and 120b, and CPU 1 through CPU 8. CPU1 through CPU4 contain cache memories (hereafter, "Cache 1 through Cache 4", respectively). CPU5 through CPU8 contain cache memories (hereafter, "Cache 5 through Cache 8", respectively) . The CPU cache memories may be internal or external caches. CPU 1 through CPU 4 may use a bus snooping protocol on CPU bus 110a to maintain coherency with one another and memory 120a. Likewise, CPU 5 through CPU 8 may use a bus snooping protocol on CPU bus 110b to maintain coherency with one another and memory 120b. If a processor needs data that is available and being held "dirty" (i.e, modified) in the cache of another processor, the processors will exchange the data, rather than access the memories 120a and 120b, thereby maintaining coherency between the processors.

Coherency between main memories 120a and 120b and Cache 1 through Cache 8 is maintained by a combination centralized/distributed directory-based cache coherency. Within directories 125a and 125b, a memory line status table ("MLST") identifies which group of processors (i.e., CPU 1 through CPU 4 or CPU 5 through CPU 8) that are coupled by a common bus (i.e., CPU bus 110a or CPU bus 110b) have which lines of memory in their associated cache memories (i.e., Cache 1 through Cache 4 or Cache 5 through Cache 8). When a processor requests data, the status table identifies where the most recent, or current, copy of the data resides. Advantageously, this method of maintaining cache coherency does not require additional work to be performed until a processor needs data that resides in a cache that cannot be accessed through snooping.

In a preferred embodiment of the present invention, all of the components, except for AMC 1 and AMC 2, of SMP system 100 comprise commodity chips, thereby minimizing system costs. For example, CPU 1 through CPU 8 may be Intel Pentium® Pro processors, I/O bus 130 may be comprised of the PCI I/O chipset, and CPU busses 110a and 110b and I/O bus 130 may be implemented using the Pentium Pro bus topology. A more detailed discussion of the operation of SMP system 100 and, more particularly, AMC 1 and AMC 2, is provided in U.S. patent application Ser. No. 08/760,126, filed Dec. 3, 1996, entitled "COMPUTER SYSTEM INCLUDING MULTIPLE SNOOPED, MULTIPLE MASTERED SYSTEM BUSSES AND METHOD FOR INTERCONNECTING SAID BUSSES," which was previously incorporated herein by reference.

Figure 2:
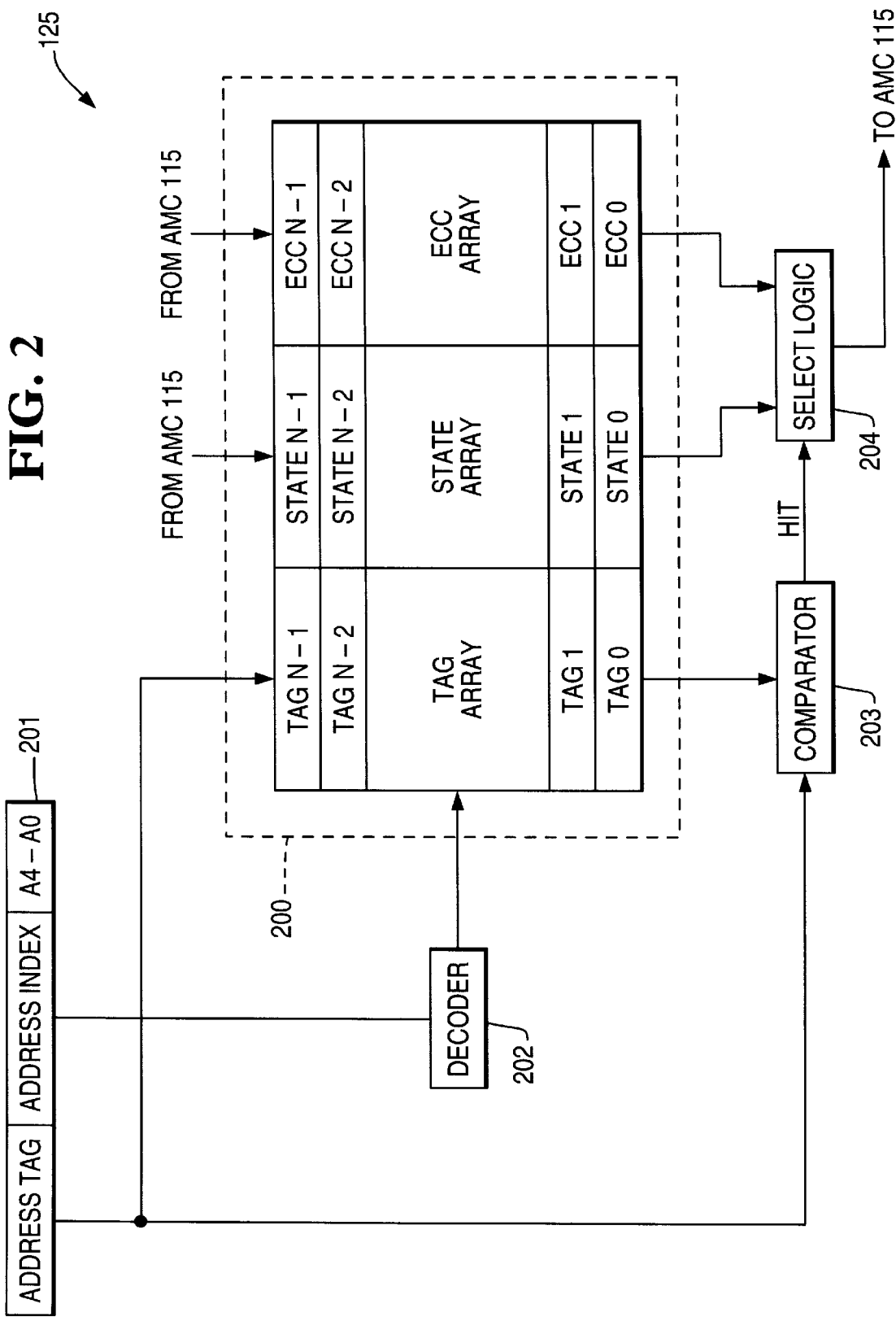
FIG. 2 illustrates an exemplary coherency directory implemented as a direct-mapped cache in accordance with one embodiment of the present invention.

Turning now to FIG. 2, illustrated is an exemplary coherency directory 125 implemented as a direct-mapped cache 200 in accordance with one embodiment of the present invention. Although the exemplary embodiment implements a direct-mapped cache 200, it should be understood that the cache 200 may just as readily be implemented as an associative or sectored cache.

AMC 115 sends to the directory 125 a physical address that is used by directory 125 to determine if the cache line addressed by the physical address is currently cached in any of the processors, CPU 1 through CPU 8. In an exemplary embodiment, the physical address comprises thirty address bits, A(29:0), wherein A(29:26) constitute an address tag, A(25:5) constitute an address index and the five least significant bits, A(4:0), are used to address individual bytes in the 32-byte cache line. Since AMC 115, memory 120, and CPU 1 through CPU 8 transfer entire cache lines during each transaction, address bits A(4:0) are not used in the operation of cache 200.

The N entries in directory 125 are indexed from 0 to N−1 by the address index. In the exemplary embodiment, address bits A(25:5) may address $N=2^{21}=2,097,152$ directory entries. Within the cache 200, the address tag bits are stored in a tag array and the state bits are stored in a state array. In a preferred embodiment, the Error Check and Correct ("ECC") bits are stored in an ECC array.

During a directory cache write operation, decoder 202 uses the address index to select the corresponding cache entry. The address tag of the current physical address is saved in the tag array, the state information for the corresponding cache line is stored in the state array, and the ECC bits, which preferably are generated by AMC 115, are stored in the ECC array. Together, the tag array, the state array and the ECC array comprise the memory line status table (MLST) for directory 125.

During a cache read operation, decoder 202 again uses the address index to select the corresponding cache entry. Comparator 203 compares the address tag of the current physical address with the stored address tag from the tag array. If the address tags match, the HIT signal from the comparator 203 enables select logic 204 to propagate the directory information (i.e., address tag, state bits and ECC bits) to AMC 115.

The coherency operations of AMC 115, directory 125 and memory 120 may be described as follows. When a read or write operation accesses memory 120, the state bits in directory 125 are read to determine the coherency operation that must be performed, according to the established protocol. If the stored address tag matches the address tag of the current physical address (a HIT), then the corresponding coherency operations are performed and the state bits are updated. If the stored address tag does not match the address tag of the current physical address (a MISS), then the coherency operations for the default state are performed (possibly none) and the address tag, state bits and ECC bits corresponding to the current physical address and the cache line that it addresses are stored in the corresponding sub-arrays of cache 200 in directory 125. This may possibly replace an existing directory entry, so that coherency operations are required to bring the replaced state bits to the default state.

From the point of view of the AMC 115, in some embodiments of the present invention, it is unnecessary to distinguish between the four CPUs to which the AMC 115 is coupled on CPU bus 110 when determining the state of a cache line. Therefore, in an exemplary embodiment of the present invention, two state bits are stored in directory 125 to indicate whether a cache line is cached local, cached remote, owned or shared. "Cached local" means that the cache line is contained in one of the four CPUs coupled to the CPU bus 110 to which the AMC 115 is connected. For example, a cache line that is cached local with respect to AMC 1 is cached in one of CPU 1 through CPU 4. A cache line that is "cached remote" with respect to AMC 1 is cached in one of CPU 5 through CPU 8.

A cache line that is "owned" is contained in one and only one of the CPUs and the corresponding cache line in memory 120 may not be the same as in the CPU cache (i.e., the cache line in memory 120 is stale). A cache line that is "shared" indicates that one or more of the CPU caches potentially have a copy of the cache line.

Under the Pentium® Pro snooping protocol employed by CPU 1 through CPU 8, three signals, DEFER, HIT and HITM, are used by any "agent" on the snooped bus to signal the correct state information to allow snooping to complete. For either CPU bus 110, the "agents" are the four CPUs and the AMC 115 coupled to the CPU bus 110. All of the CPUs and the AMC 115 monitor the P6 bus and recognize when a valid snoop phase is initiated.

If both HIT and HITM are simultaneously asserted, the CPUs and the AMC 115 recognize that one or more of the CPUs and/or the AMC 115 need more time to resolve the snoop phase. Therefore, the CPUs and the AMC 115 delay two clock cycles and check the snoop phase again. This is repeated as long as necessary until only HIT, or only HITM, or neither, is asserted. If DEFER is asserted, then the bus cycle is either retried or deferred (converted to a split transaction request). DEFER is often asserted to allow the AMC 115 to resolve coherency issues related to the line being accessed.

If the snoop phase resolves with only HIT asserted, this indicates to the requesting CPU that one or more of the CPUs and the AMC 115 may hold a shared copy of that cache line, so that the requesting CPU may only go to the shared state. If the snoop phase resolves with only HITM asserted, this indicates to the requesting CPU that another of the CPUs holds a "dirty" (or modified) copy of that cache line, so that the CPU holding the modified requested cache line must supply the requesting CPU with the requested cache line, rather than the memory 120. If neither HIT nor HITM is asserted during the snoop phase, the requesting CPLF is then free to mark the cache line as "M" (modified) or "E" (exclusive) in its own internal cache, according to the MESI protocol. If a cache line is marked either "M" or "E" by a CPU, the cache line is "owned" by that CPU with respect to the other seven CPUs and both AMC 115a and AMC 115b.

In one embodiment of the present invention, a requesting CPU is only allowed to go to the coherency state it has requested. For example, if CPU 1 requests a shared copy of a cache line, the AMC 115 always asserts HIT during the snoop phase of this shared request if the cache line is either invalid (i.e., no other CPU on the same CPU bus 110 contains the cache line) or shared on that CPU bus 110. If the AMC 115 did not assert HIT and the line was invalid, the requesting CPU would be allowed to go to the exclusive state, since it would not detect a HIT during the snoop phase.

The Pentium® Pro snooping protocol requires the AMC 115 to look in directory 125 to determine whether it is safe to assert HIT. If the cache line is, or may be, either "E" or "M", then the AMC 115 must not assert the HIT signal, because this may cause a failure of SMP system 100 due to infinite snoop stall loops. This is possible if AMC 115 asserts HIT and a CPU asserts HITM. The simultaneous assertion of HIT and HITM looks like a snoop stall condition and eventually results in a timeout or system failure.

Directory coherency corruption (including multi-bit ECC errors in the directory 125) can result in system stalls related to the Pentium® Pro bus protocol and the directory-based coherency implemented in the SMP system 100. The AMC 115 can also detect other possible system coherency failure conditions external to the directory 125 that may result in, or indicate a potential for, coherency loss in the SMP system 100. A possible system coherency failure condition may result, for example, from P6 bus protocol tracking errors that reset the state machines of the agents (e.g., CPUs) attached to the Pentium® Pro bus. Resetting these agent state machines may result in the non-completion of pending coherency state changes.

The actual and potential coherency loss events described above generate non-maskable interrupts that result in the execution of one or more error handling and logging routines that allow the SMP system 100 to recover as much as possible. Execution of this software routine itself may be negatively impacted by the handling of the cache lines that have lost coherency. This increases the risk of a second fatal error occurring while trying to run the error handling and logging software routine. The error handling and logging software routine is unlikely to be able to recover from this second error. The present invention ensures reliable system shutdown and appropriate error logging by dynamically changing the above-described directory-based coherency algorithms.

Advantageously, the present invention relies on the fact that the area of the directory 125 that is corrupted is likely not required in order to shut down the SMP system 100 in a controlled manner. This is because the error handling and logging software routines are generally not executed during normal operations prior to an error event. Alternatively, if the error handling and logging software routines are executed during normal operations, the majority of these lines are likely to be in a shared state and are not prone to many of the above-described errors.

Turning now to FIG. 3, illustrated is a flow diagram depicting the operation of an exemplary AMC 115 upon detection of directory coherency corruption in the exemplary coherence directory 125 or a possible system coherency failure condition in the SMP system 100 according to one embodiment of the present invention. During a routine memory request operation, the AMC 115 monitors the directory 125, the CPU bus 110, and the I/O bus 130, process step 301, to detect directory coherency corruption in directory 125 or a possible system coherency failure condition in the SMP system 100, process step 302. If neither is found, the AMC 115 continues to monitor the directory 125, the CPU bus 110, and the I/O bus 130 in subsequent memory request operations (i.e., loop back to process step 301).

If a directory coherency corruption or a possible system coherency failure condition is found, it is determined whether the detected coherency problem is a multi-bit ECC error in a particular directory entry, process step 303. If a multi-bit error has occurred, the AMC disables any additional further coherency replacement operation(s) with respect to that particular directory entry. If multi-bit ECC errors have occurred, the AMC 115 is unable to determine what is the correct address tag or the correct state for the directory entry selected by the address index. The AMC 115 is also unable to determine what is the correct bus containing the CPU that was caching the selected directory entry. Under these conditions, issuing a replacement coherency operation with the incorrect address may cause the AMC 115 to eventually hang up the SMP system 100.

For both a directory coherency corruption (including multi-bit ECC error) and a possible system coherency failure condition, the AMC 115 disables all routine coherency checks, process step 305. The AMC 115 normally performs sanity checks for the incoming memory request with the current state bits in the directory 125 to help detect errors as early as possible. However, once coherency is corrupted, there are likely to be future invalid cycles attempted as the CPUs evict cache lines.

Next, the AMC 115 begins treating all shared memory requests as ownership requests, process step 306. To do this, the AMC 115 never assets HIT for shared requests. This prevents the infinite snoop stalls that might occur if a CPU believes it contains a cache line marked "E" or "M," but the AMC 115 believes that the cache line is marked as "I" or "S" by the CPU.

After the AMC 115 has dynamically modified the coherency algorithms used during normal operations, the AMC 115 services the error logging routines and system shutdown routines performed by the SMP system 100, process step 307. As mentioned above, the error logging routines and system shutdown routines will generally operate without causing further errors because the area of the directory 125 that is corrupted is likely not required by these routines, which are generally not executed during normal operations prior to an error event. Alternatively, if the error handling and logging software routines are executed during normal operations, the majority of these lines are likely to be in a shared state and are not prone to many of the above-described errors.

Although the present invention and its advantages have been described in detail, those skilled in the art should understand that various changes, substitutions and alterations herein may be made without departing from the spirit and scope of the invention in its broadest form.

What is claimed is:

1. A memory control circuit for use in a processing system containing a plurality of processors coupled to a main memory by a common bus, the memory control circuit to implement directory-based coherency in said processing system according to a selected coherency algorithm, the memory control circuit comprising:

monitoring circuitry to detect coherency corruption in a coherency directory associated with said main memory; and coherency control circuitry responsive to a detection of coherency corruption in said coherency directory to dynamically modify said selected coherency algorithm, the modified coherency algorithm to enable, said processing system to shut down in a controlled manner.

2. The memory control circuit set forth in claim 1 wherein said coherency directory comprises a cache memory containing directory information associated with a subset of memory lines in said main memory.

3. The memory control circuit set forth in claim 1 wherein said monitoring circuitry detects possible system coherency failure conditions external to said coherency directory, and wherein said coherency control circuitry responds to a detection of a possible system coherency failure condition by dynamically modifying said selected coherency algorithm, the modified coherency algorithm enabling said processing system to shut down in a controlled manner.

4. The memory control circuit set forth in claim 1 wherein said memory control circuit treats a shared memory request received from a first processor as a memory request for a cache line to be held exclusively by said first processor.

5. The memory control circuit set forth in claim 1 wherein said memory control circuit treats a shared memory request received from a first processor as a memory request for a cache line to be held modified by said first processor.

6. The memory control circuit set forth in claim 1 wherein said monitoring -circuitry monitors multi-bit ECC errors in directory information associated with memory lines in said main memory.

7. The memory control circuit set forth in claim 6 wherein said memory control circuit disables coherency replacement operations in said coherency directory for any directory entry having multi-bit ECC errors in said directory information.

8. A processing system comprising:

a plurality of processors;

a main memory;

a memory control circuit to implement directory-based coherency in said processing system according to a selected coherency algorithm, comprising:

monitoring circuitry to detect coherency corruption in a coherency directory associated with said main memory; and coherency control circuitry responsive to a detection of coherency corruption in said main memory to dynamically modify a selected coherency algorithm, the modified coherency algorithm enabling said processing system to shut down in a controlled manner.

9. The processing system set forth in claim 8 wherein said coherency directory comprises a cache memory containing directory information associated with a subset of memory lines in said memory.

10. The processing system set forth in claim 8 wherein said monitoring circuitry detects possible system coherency failure conditions external to said coherency directory, and wherein said coherency control circuitry responds to a detection of a possible system coherency failure condition by dynamically modifying said selected coherency algorithm, the modified coherency algorithm enabling said processing system to shut down in a controlled manner.

11. The processing system set forth in claim 8 wherein said memory control circuit treats a shared memory request received from a first processor as a memory request for a cache line to be held exclusively by said first processor.

12. The processing system set forth in claim 8 wherein said memory control circuit treats a shared memory request received from a first processor as a memory request for a cache line to be held modified by said first processor.

13. The processing system set forth in claim 8 wherein said monitoring circuitry monitors multi-bit ECC errors in directory information associated with memory lines in said main memory.

14. The processing system set forth in claim 13 wherein said memory control circuit disables coherency replacement operations in said coherency directory for any directory entry having multi-bit ECC errors in said directory information.

15. In a processing system containing a plurality of processors coupled to a main memory by a common bus, a method of operating a memory control circuit adapted for implementing directory-based coherency in the processing system according to a selected coherency algorithm, the method comprising:
  detecting coherency corruption in a coherency directory associated with the main memory; and
  in response to detection of coherency corruption in the coherency directory, dynamically modifying the selected coherency algorithm enabling the processing system to shut down in a controlled manner.

16. The method set forth in claim 15 wherein the coherency directory comprises a cache memory containing directory information associated with a subset of memory lines in the main memory.

17. The method set forth in claim 15 further comprising:
  detecting possible system coherency failure conditions external to the coherency directory; and
  in response to a detection of a possible system coherency failure condition, dynamically modifying the selected coherency algorithm, the modified coherency algorithm enabling the processing system to shut down in a controlled manner.

18. The method set forth in claim 15 further comprising treating a shared memory request received from a first processor as a memory request for a cache line to be held exclusively by the first processor.

19. The method set forth in claim 15 wherein detecting coherency corruption comprises detecting multi-bit ECC errors in directory information associated with memory lines in said memory.

20. The method set forth in claim 19 further comprising disabling coherency replacement operations in the coherency directory for a directory entry having multi-bit ECC errors in the directory information.

* * * * *